United States Patent [19]

Bible et al.

[11] 4,116,155

[45] Sep. 26, 1978

[54] INDICATOR FLAG CONSTRUCTION

[75] Inventors: Harley V. Bible, Maryville; Clifford E. Goff; William T. Moon, Jr., both of Knoxville, all of Tenn.

[73] Assignee: Robertshaw Controls Company, Richmond, Va.

[21] Appl. No.: 790,406

[22] Filed: Apr. 25, 1977

[51] Int. Cl.² .............................................. G01L 19/08
[52] U.S. Cl. ................................ 116/65; 116/114 PV; 137/557
[58] Field of Search .......... 116/65, 114 PV, DIG. 42, 116/117 C; 73/420, 432 A; 137/557

[56] References Cited

U.S. PATENT DOCUMENTS

| | | | |
|---|---|---|---|
| 2,502,776 | 4/1950 | Burdick | 116/DIG. 42 |
| 2,780,198 | 2/1957 | Low | 116/DIG. 42 |
| 2,977,801 | 4/1961 | Dean | 73/432 A |
| 3,254,670 | 6/1966 | Puster | 116/114 PV X |
| 3,532,069 | 10/1970 | Morgan | 116/114 PV |
| 3,623,448 | 11/1971 | Rosh | 116/114 PV |
| 3,939,796 | 2/1976 | Smith et al. | 137/557 X |

Primary Examiner—Daniel M. Yasich
Attorney, Agent, or Firm—Candor, Candor & Tassone

[57] ABSTRACT

An indicator construction having a housing carrying a movable flag member and a movable plunger operatively associated with the flag member to cause movement thereof upon movement of the plunger, a spring member being operatively interconnected to the plunger and operatively interconnected to the movable flag member to cause movement thereof upon movement of the plunger.

14 Claims, 16 Drawing Figures

INDICATOR FLAG CONSTRUCTION

This invention relates to an improved indicator construction.

It is well known that pneumatically operated indicator constructions have been provided wherein each indicator construction has a movable flag member which in one position thereof indicates a safe condition of the system being monitored thereby and in another position thereof indicates an unsafe condition thereof, the flag member being moved by a pneumatically operated movable plunger of the indicator construction.

In the co-pending patent application, Ser. No. 778,996, filed Mar. 18, 1977, an improved safety control system is provided which merely requires the setting of a selector means thereof to any one of a plurality of monitoring conditions thereof which causes the system to monitor a respective variable of process machinery and operate an indicator to indicate an unsafe condition thereof as well as initiate a shutdown of the process machinery if the particular variable requires such a shutdown.

It is a feature of this invention to incorporate such improved safety control system into a self-contained indicator construction.

It is also a feature of this invention to provide an indicator construction that can be utilized with other control systems if desired.

In particular, known indicator constructions each has the movable plunger thereof operating directly against the movable flag member to pivot the movable flag member relative to the indicator construction carrying the same.

However, according to the teachings of this invention, improved means are provided for operatively interconnecting the movable plunger to a movable flag member of the indicator construction.

In particular, one embodiment of this invention provides an indicator construction having a housing means carrying a movable flag means and a movable plunger operatively associated with the flag means to cause movement thereof upon movement of the plunger. A spring member is operatively interconnected to the plunger and is operatively interconnected to the movable flag means to cause movement thereof upon movement of the plunger.

Accordingly, it is an object of this invention to provide an improved indicator construction having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 2:
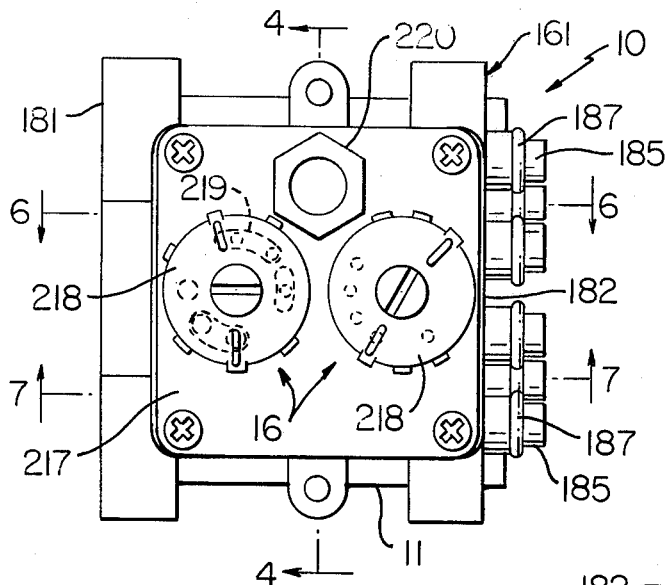
FIG. 2 is an end view of the improved indicator construction of this invention.
Figure 7:
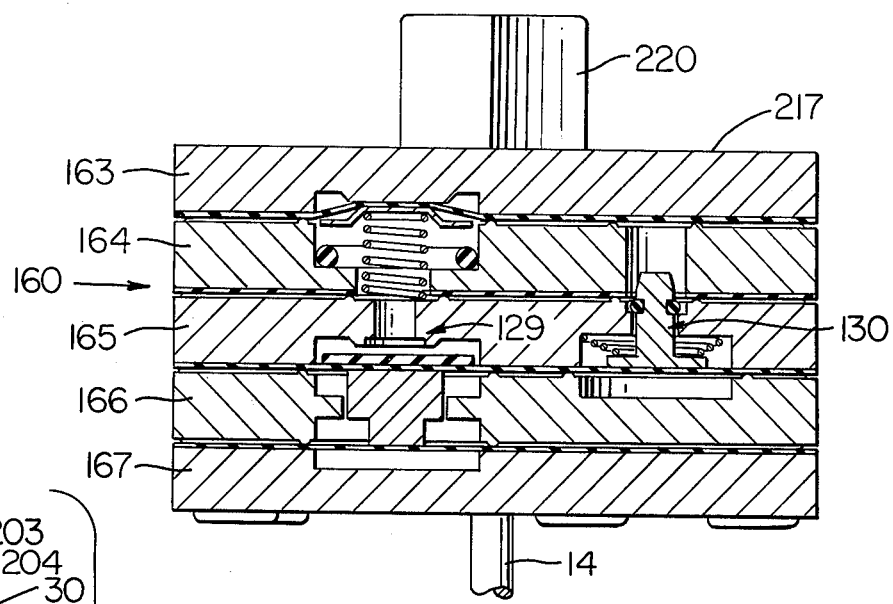

Similarly, FIG. 7 is an enlarged cross-sectional view taken on line 7—7 of FIG. 2 and illustrates only the logic section of the indicator construction of FIG. 2.

Figure 4:
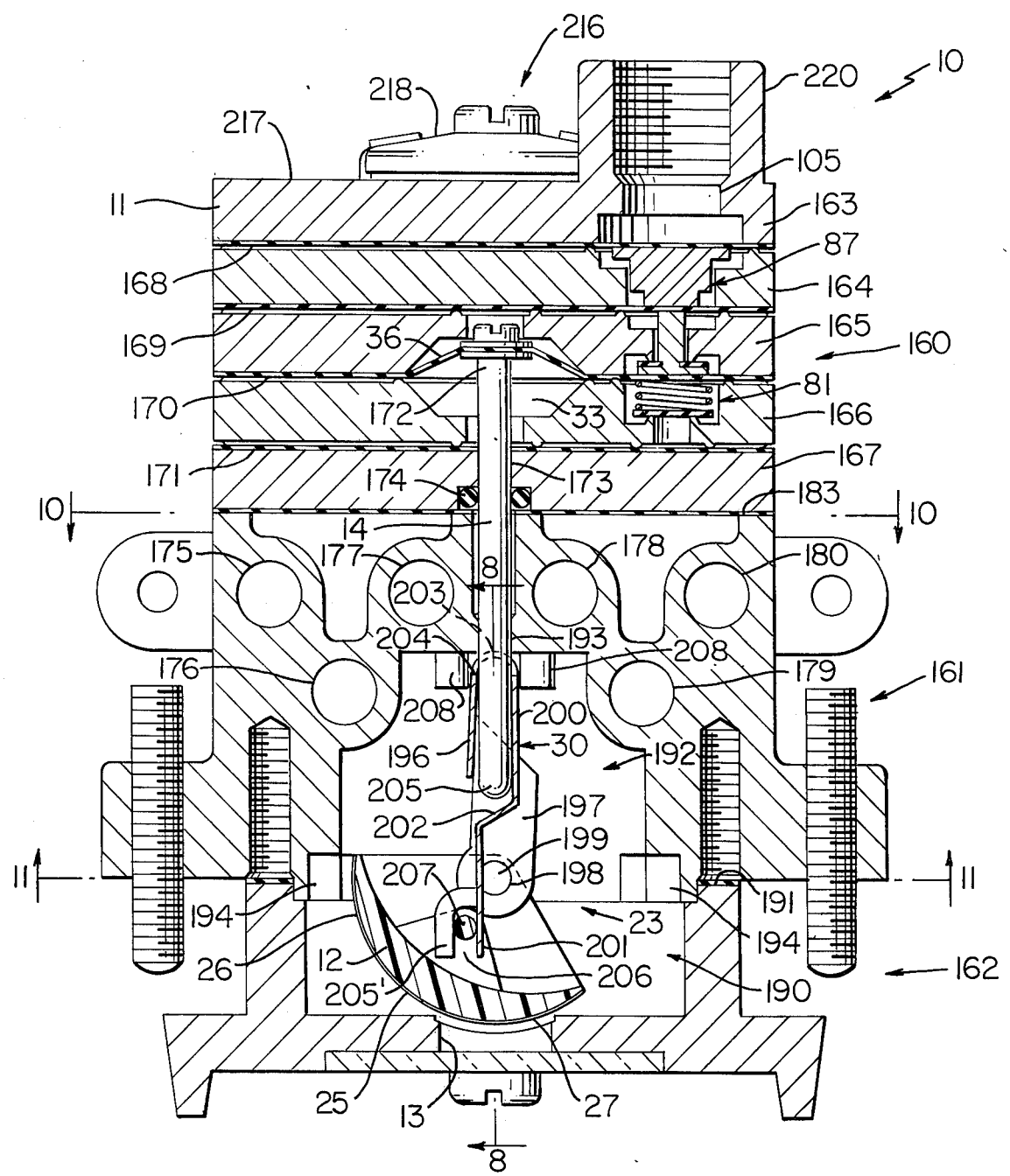
FIG. 4 is an enlarged cross-sectional view taken on line 4—4 of FIG. 2.
Figure 8:
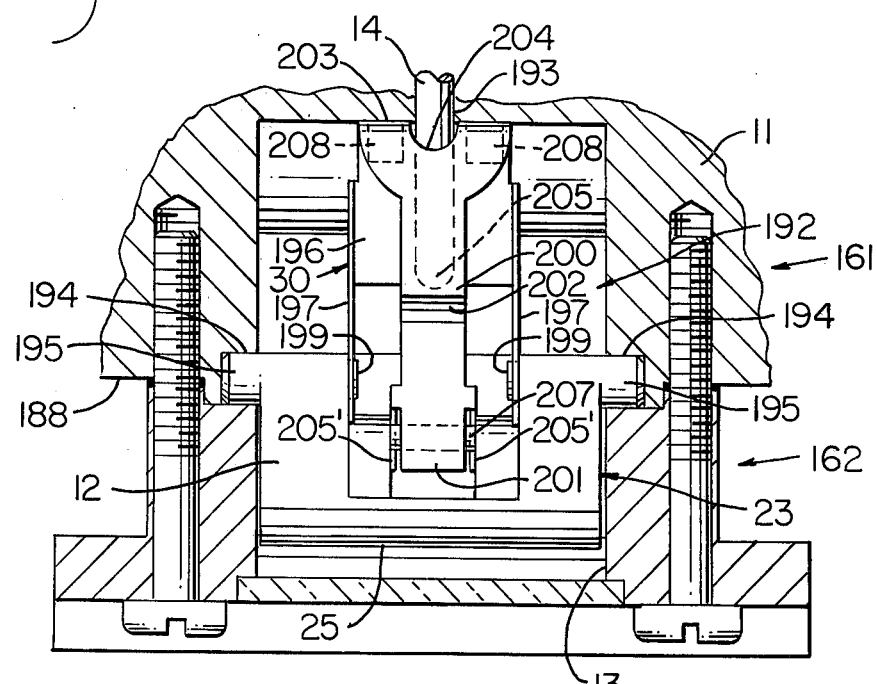

FIG. 8 is a fragmentary cross-sectional view taken on line 8—8 of FIG. 4.

Figure 9:
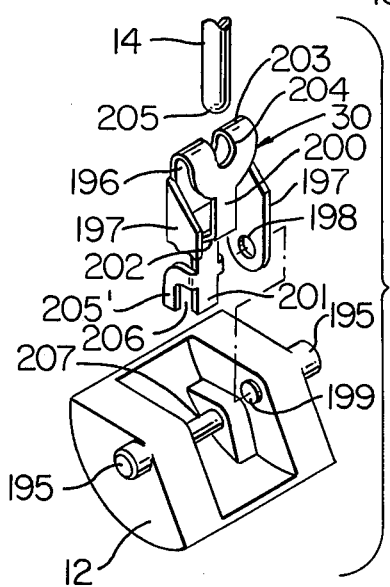

FIG. 9 is a reduced exploded perspective view of the flag means of FIG. 8 and the spring means for interconnecting the plunger thereto.

Figure 10:
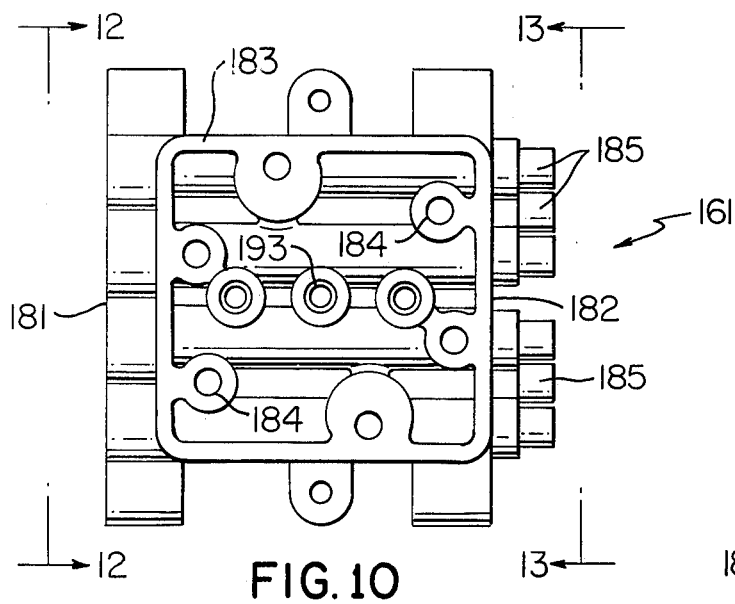

FIG. 10 is a reduced cross-sectional view taken on line 10—10 of FIG. 4.

Figure 11:
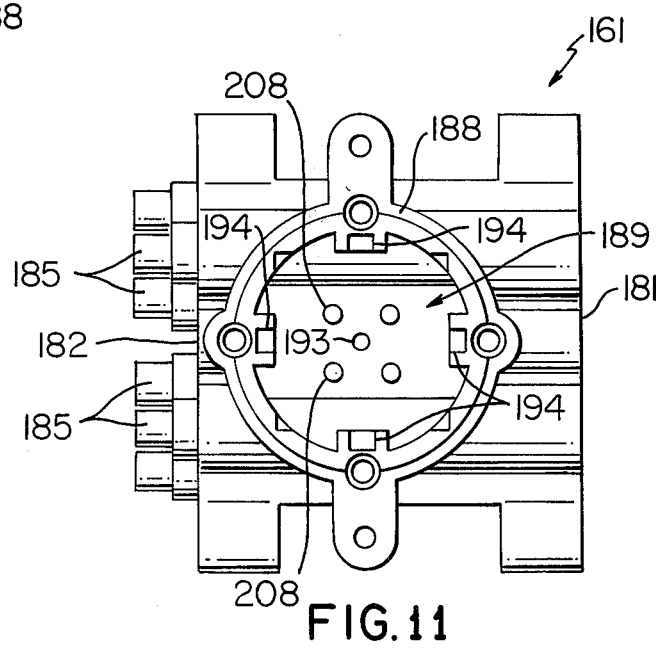

FIG. 11 is a reduced cross-sectional view taken on line 11—11 of FIG. 4.

Figure 12:
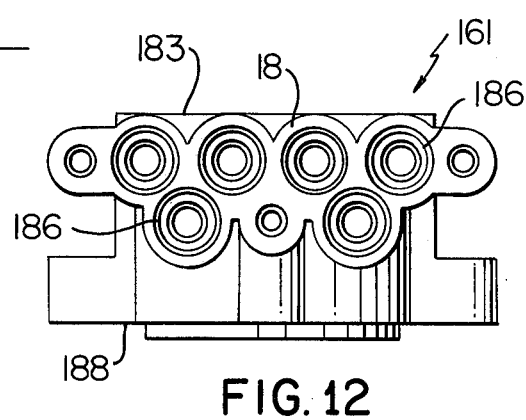

FIG. 12 is an end view of the structure illustrated in FIG. 10 and is taken in the direction of the arrows 12—12 thereof.

Figure 13:
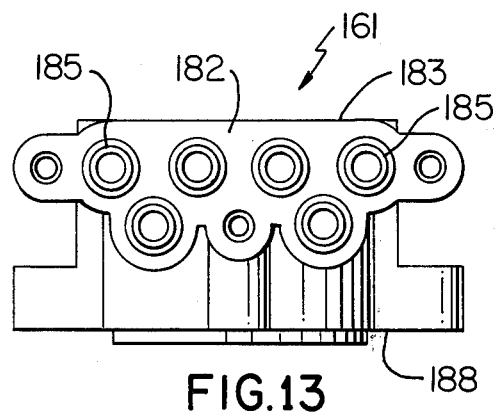

FIG. 13 is an end view of the structure of FIG. 10 and is taken in the direction of the arrows 13—13 thereof.

Figure 14:
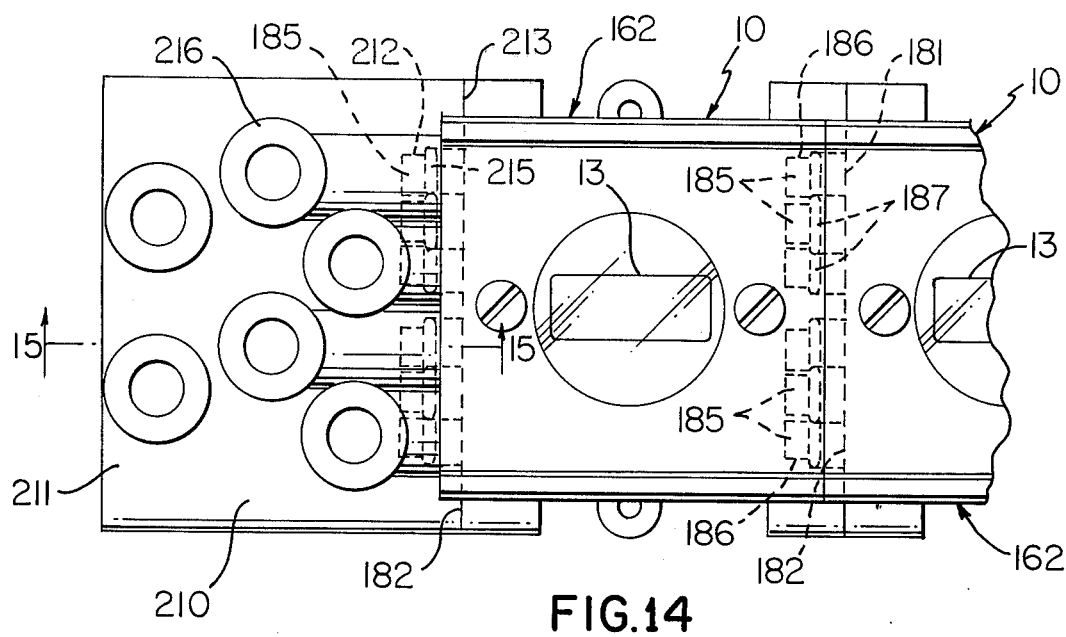

FIG. 14 is a fragmentary view illustrating two of the indicator constructions of this invention interconnected together with a manifold member therefor.

Figure 15:
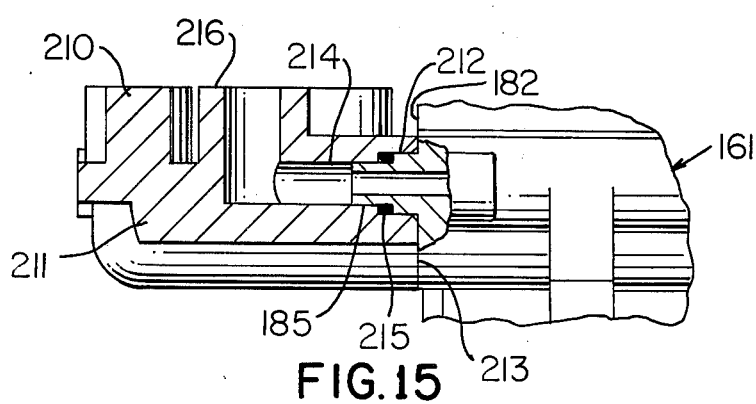

FIG. 15 is a fragmentary cross-sectional view taken on line 15—15 of FIG. 14.

Figure 16:
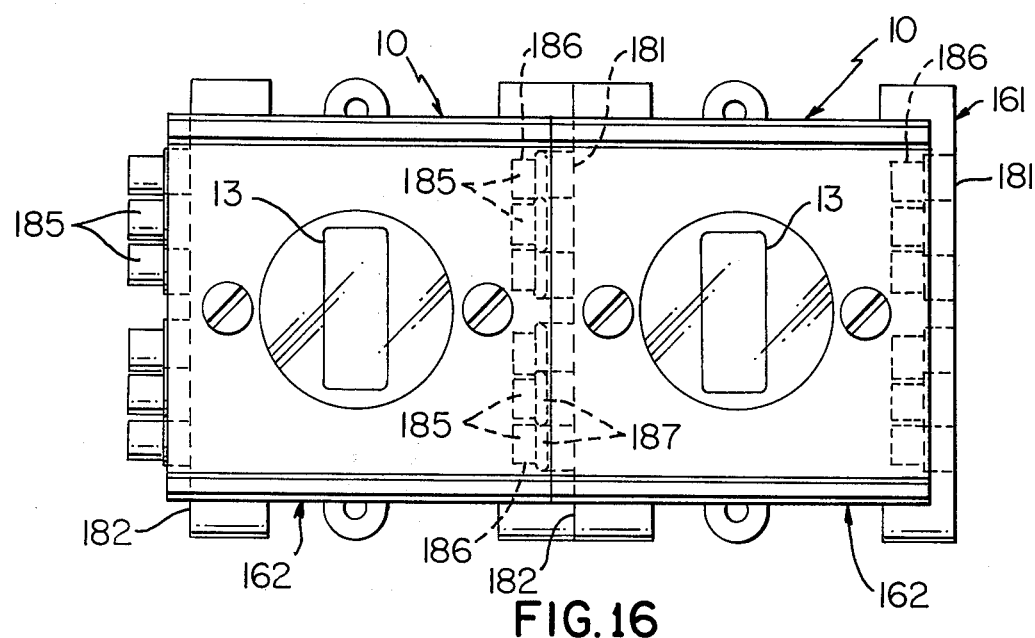

FIG. 16 illustrates two indicator constructions of this invention interconnected together after the flag means and window plate thereof have been rotated 90°.

While the various features of this invention are hereinafter illustrated and described as being particularly adapted to incorporate a particular selectively changeable safety control system into a self-contained indicator construction, it is understood that the various features of this invention can be utilized singly or in any combination thereof to provide an indicator construction for other systems as desired.

Therefore, this invention is not to be limited to only the embodiment illustrated in the drawings because the drawings are merely utilized to illustrate one of the wide variety of the uses of this invention.

Figure 3:
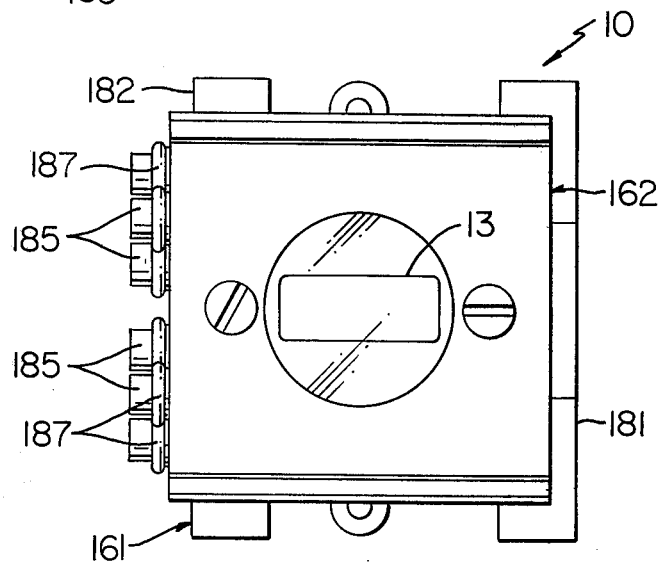
FIG. 3 is an opposite end view of the indicator construction of FIG. 2.

Referring now to FIGS. 2, 3 and 4, the improved indicator construction of this invention is generally indicated by the reference numeral 10 and comprises a housing means 11 carrying a movable flag means 12 that is viewable at a window 13 of the housing means 11 to indicate different conditions, such as the condition of FIG. 4 or the condition of FIG. 5 depending upon the position of a pneumatically operated movable plunger 14 of the housing means 11 in a manner hereinafter set forth.

As previously stated, the indicator construction 10 of this invention is particularly adapted to incorporate a selectively changeable safety control system of the afore-mentioned co-pending patent application and such system is generally indicated by the reference numeral 15 in FIG. 1 and will be described immediately following a discussion of the need for such a system 15.

The main control system of the invention of the aforementioned co-pending patent application comprises a control system for process machinery such as an engine that is adapted to be supplied fuel from a fuel source through a penumatically operated fuel valve when the fuel valve has fluid pressure applied thereto from a fluid pressure source by the main control system.

Such main control system includes a plurality of individual safety control systems each of which is generally indicated by the reference numeral 15 in FIG. 1 with each safety control system 15 being adapted to monitor a certain variable of the process machinery during the start-up and running of the process machinery as will be apparent hereinafter.

In general, since there are many different types of variables of process machinery and the like that can be monitored by a safety system, which variables have been classified according to their condition at start-up. Five such classifications are class A variables, class B variables, class C variables, alarm variables and position variables.

Class A variables are variables that are normally safe when process machinery is not running. An example would be engine coolant temperature. Accordingly, a sensor can be set to shutdown the engine if coolant temperature gets too high and would be connected by a signal pressure to a class A indicator. If coolant temperature gets too high, the sensor will vent the signal pressure causing the class A indicator to initiate a shutdown.

Class B variables are variables that are normally unsafe when the process machinery is not running. These variables must be locked out or by-passed to allow engine start-up and are of such nature that a time period is prescribed during which they must become safe in order to prevent a shutdown. An example is engine oil pressure. A sensor set to shut down the engine if oil pressure gets too low would be connected by signal pressure to a class B indicator. If the coil pressure gets too low the sensor vents signal pressure causing the class B indicator to initiate a shutdown. However, there is no oil pressure when the engine is not running, so a class B indicator is distinguished by incorporating a valve or relay which is controlled by a timer to lock out the shutdown circuit for a predetermined amount of time, allowing the engine to be started.

Class C variables are those that are normally unsafe when the process machinery is not running. These variables must be locked out to allow engine start-up but are of such a nature that a time period is not prescribed for this lock out. These functions are locked out until they become safe. Once they become safe, they are capable of initiating a shutdown. An example would be engine under-speed. A sensor set to shutdown the engine if RPM gets too low would be connected by signal pressure to a class C indicator. If engine RPM gets too low, the sensor vents the signal pressure causing the class C indicator to initiate a shutdown. However, the engine is under speed when it is not running so a class C indicator is distinguished by incorporating a valve or relay (which is controlled by a separate valve or relay and signal pressure) to lock out the shutdown circuit until engine is started and operating with a speed that the speed sensor determines is safe.

Alarm variables are those variables that require immediate attention upon becoming unsafe but do not require shutting down the process machinery to correct. An example would be coolant level. A sensor set to sound an alarm if coolant level gets too low is connected by signal pressure to an Alarm indicator. If the coolant level gets too low, the sensor vents signal pressure causing the Alarm indicator to sound an alarm horn. Alarm indicators are basically the same as class C indicators except they are used to sound an alarm instead of initiating a shutdown.

Position variables indicators monitor position and condition of the variables but do not initiate further action such as shutdown or alarm. An example would be a valve position, opened or closed.

Each system 15 for the indicator construction 10 of this invention is identical to the other system 15 for the other indicator constructions 10 of this invention and each system 15 can be selectively changed by merely setting a selector means 16 thereof to one of five settings thereof corresponding to the aforementioned five types of variables to monitor such type of variable for a main control system for the aforementioned engine or for other control systems in a manner hereinafter described.

Figure 1:
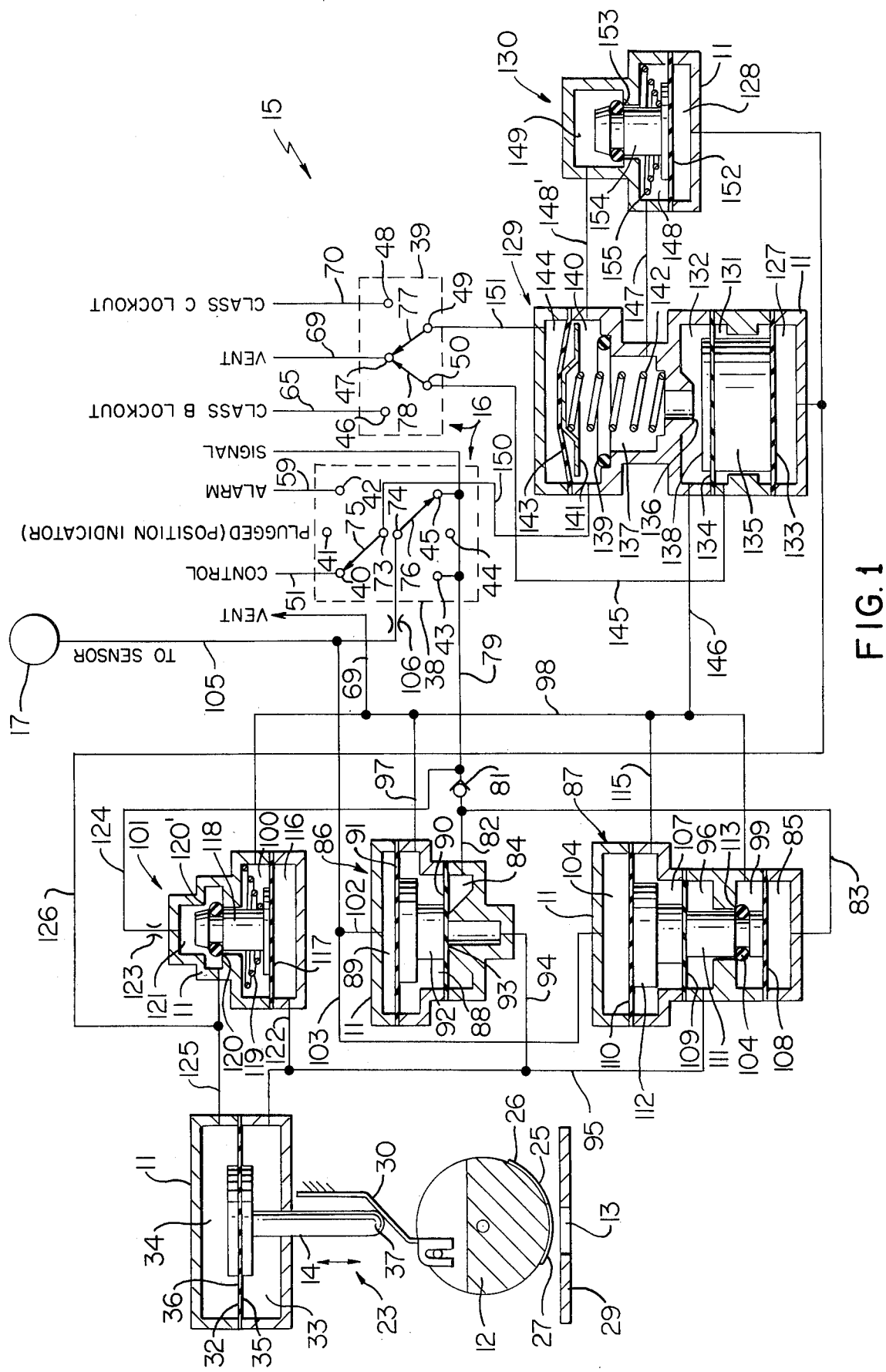
FIG. 1 is a schematic view illustrating the improved selectively changeable safety control system of the aforementioned co-pending patent application that is incorporated into the indicator construction of this invention.

However, for purposes of illustration, it can be seen in FIG. 1 that the particular system 15 is set for measuring a class A variable such as by having its sensor 17 set to shut down an engine if the coolant temperature of the engine gets too high. However, the system 15 could be set so that its sensor 17 will monitor a class B variable, such as by having the sensor 17 sensing the low oil pressure of the engine. The system 15 could be set to monitor a class C variable, such as by having it sensor 17 sense engine underspeed for the engine. The system 15 could be set to monitor an Alarm variable such as by having its sensor 17 sense the low level of the coolant of the engine. The system 15 could be set to monitor a Position variable and in place of its sensor 17 a pneumatically operated valve can be provided which is either opened or closed and the system 15 will indicate whether the valve is opened or closed.

Since the structure of each system 15 utilized in a main control system is identical except for the particular setting of the selector means 16 thereof as will be apparent hereinafter, only the details of one system 15 need be described.

Accordingly, reference is now made to FIG. 1 wherein the system 15 is illustrated as including a plurality of individual housing parts of the housing means 11 fluidly interconnected together by internal passage means of the housing means 11 in a manner well known in the art and hereinafter described.

The system 15 includes a pneumatically operated indicator generally indicated by the reference numeral 23 that comprises the aforementioned rotatable member 12 having flag means 25 thereon that is divided into a green portion 26 and a red portion 27, the green portion 26 or the red portion 27 being viewable through the window 13 in a plate 29 of the housing means 11 depending upon the position of the rotatable member 12. A unique spring 30 of this invention tends to maintain the red portion 27 of the flag 25 viewable at the window 13 and is so permitted to maintain the red portion 27 at the window 13 when the actuator plunger 14 is pneumatically moved upwardly by a flexible diaphragm 32 carrying the same as illustrated in FIG. 4 and cooperating with the housing means 11 to define two compartments 33 and 34 respectively disposed on opposite sides 35 and 36 of the flexible diaphragm 32.

Figure 5:
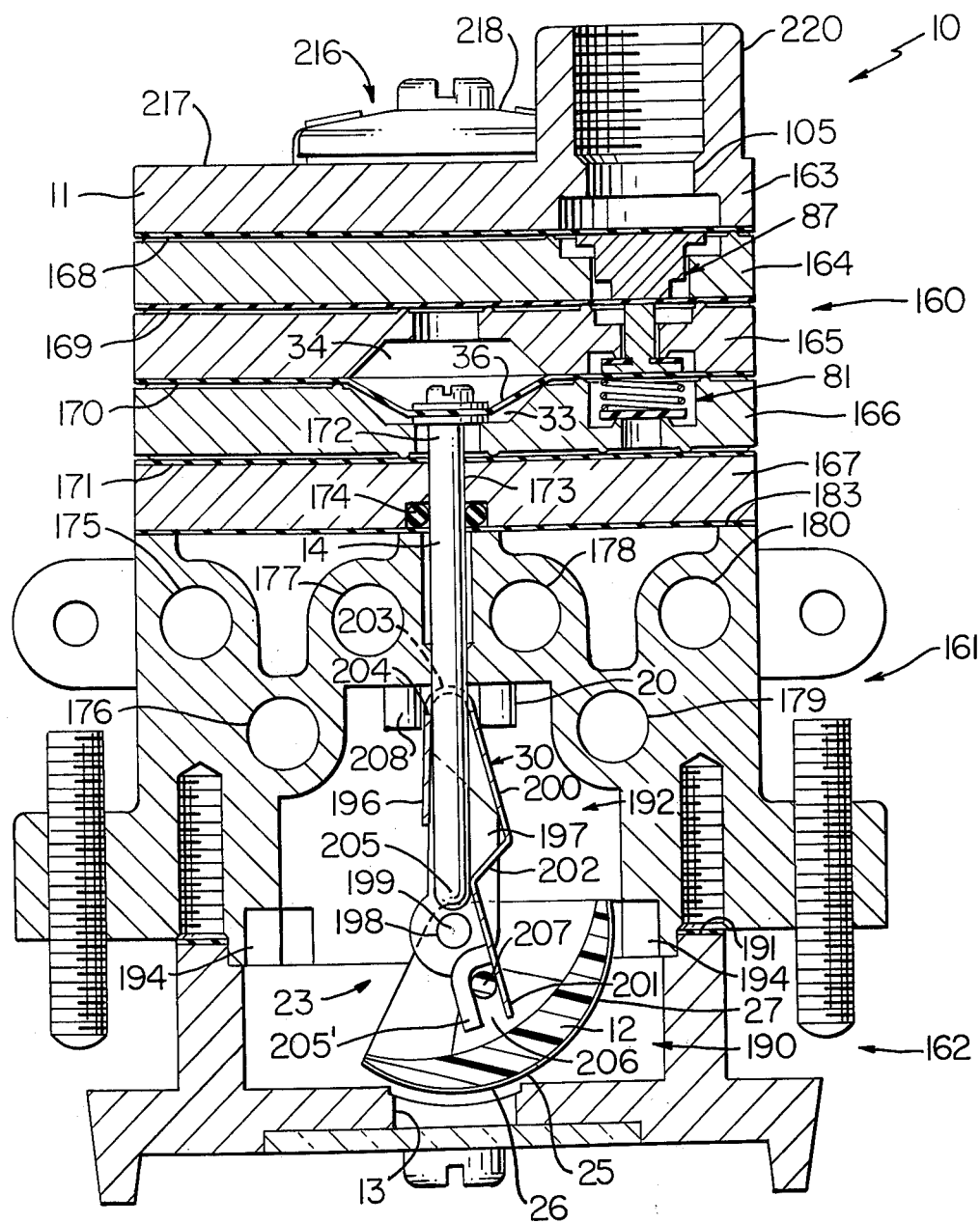
FIG. 5 is a view similar to FIG. 4 and illustrates the indicator construction in another indicating position thereof.

However, when the stem 14 is driven downwardly in FIG. 1 and as illustrated in FIG. 5, the end 37 of the stem 14 operates on the spring 30 to cause rotation of the rotatable member 12 so that the green portion 26 of the flag means 25 thereof will now be viewable at the opening 13 and will remain viewable at the window 13 as long as the flexible diaphragm 32 is in a down condition as will be apparent hereinafter.

When the red portion 27 of the flag means 25 of the indicator 23 is viewable at the window 13, such red indication indicates an unsafe condition of the variable being monitored by the system 15. Conversely, as long as the green portion 26 of the flag means 25 of indicator 23 is being viewable at the window 13, such green indication at the window 13 indicates that the condition being monitored by the system 15 is in a safe condition thereof.

The selector means 16 of the system 15 comprises two selector plates 38 and 39 with the selector plate 38 having port means 40, 41, 42, 43, 44 and 45 therein while the plate 39 has port means 46, 47, 48, 49 and 50 therein.

The port 40 of the plate 38 is interconnected to a control passage 51 which in the main system controls a pneumatically operated fuel valve for the engine.

The ports 41 and 44 of the plate 38 are plugged for a purpose hereinafter described.

The port 42 of the plate is interconnected to a passage 59 which in the main system controls an alarm horn to sound the same whenever fluid pressure in the passage 59 is vented as will be apparent hereinafter.

The port 46 of the selector plate 39 is interconnected to a passage 65 which in the main system leads to a class B pneumatically operated timer relay.

The port 47 in the plate 39 is interconnected to a passage 69 that is vented to the atmosphere.

The port 48 of the selector plate 39 is interconnected to a passage 70 which in the main system controls a class C lockout relay.

The selector plate 33 includes two other ports 73 and 74 respectively interconnected to manually adjustable fluid switching members 75 and 76 which respectively are adapted to interconnect their ports 73 and 74 with one of the outer ports 40–42 and 43–45 as illustrated.

Similarly, the two ports 49 and 50 of the selector plate 39 are interconnected to manually adjustable fluid transmitting members 77 and 78, the switching member 78 being adapted to either interconnect the port 50 with the port 46 or to the port 47 while the switching member 77 is adapted to interconnect the port 49 either with the port 47 or with the port 48.

The ports 43 and 45 of the selector plate 38 are fluidly interconnected to a signal pressure passage 79 of the main system.

The signal pressure 79 leads through a one-way check valve 81 to two branch passages 82 and 83 which are respectively fluidly interconnected to chambers 84 and 85 of the valve units 86 and 87.

The valve unit 86 is divided into chambers 84, 88 and 89 by two flexible diaphragms 90 and 91 carried by the housing means 11 and being separated from each other by a movable spacer 92. The chamber 84 of the valve unit 86 leads to a valve seat 93 that is adapted to be opened and closed by the flexible diaphragm 90, the valve seat 93 being interconnected to a passage 94 that is interconnected to a passage 95 that leads from the chamber 33 of the pneumatically operated indicator 23 to a chamber 96 of the valve unit 87.

The chamber 88 of the valve unit 86 is interconnected by a passage 97 to a passage 98 that interconnects a chamber 99 of the valve unit 87 to a chamber 100 of another valve unit 101 of the system 15.

The chamber 89 of the valve unit 86 is interconnected by a passage 102 to a passage 103 that interconnects a chamber 104 of the valve unit 87 to a passage 105 that leads to the particular sensor of the system 15, which in the main system is the coolant high temperature sensor 17 for a purpose hereinafter described, whereby the passage 105 is a sensor passage.

The sensor passage 105 of the system 15 also is interconnected by a restrictor 106 to the port 74 of the selector plate 38.

The valve unit 87 is divided into the chambers 85, 99, 96, 107 and 104 by flexible diaphragms 108, 109, and 110 carried by the housing means 11 and being respectively spaced from each other by movable spacers 111 and 112.

The housing means 11 for the valve unit 87 includes a valve seat 113 that is adapted to interconnect the chambers 99 and 96 together when the valve seat 113 is opened by the valve member 114 being carried on the spacer 111 and being moved away from the valve seat 113.

The chamber 107 of the valve unit 87 is interconnected by a passage 115 to the passage 98.

The valve unit 101 is divided into two chambers 100 and 116 by a flexible diaphragm 117 caried by the housing means 11, the flexible diaphragm 117 controlling the movement of a valve member 118 that is normally biased by a compression spring 119 to close a valve seat 120 that leads from the chamber 100 to another chamber 121 of the valve unit 101.

The chamber 116 of the valve unit 101 is interconnected by a passage 112 to the passage 95 while the chamber 121 of the valve unit 101 is interconnected through a restrictor 123 to a passage 124 that interconnects to the signal pressure passage 79 upstream of the one-way check valve 81.

The chamber 121 of the valve unit 101 is also interconnected to a passage 124 that leads to the chamber 34 of the pneumatically operated indicator 23, the passage 125 being interconnected to a passage 126 that is respectively fluidly interconnected to chambers 127 and 128 of two other valve units 129 and 130 of the system 15.

The housing means 11 of the valve unit 101 has another valve seat 120′ adapted to be opened and closed by the valve member 118, the valve seat 120′ being spaced from the valve seat 120 whereby when the valve member 118 is closed against the valve seat 120, the passage 125 is interconnected to the passage 124 through the open valve seat 120′. However, when the valve seat 120′ is closed by the valve member 118, the passage 125 is interconnected to the passage 98 through the open valve seat 120 while the passage 124 is blocked by the closed valve seat 120′.

The valve unit 129 is divided into chambers 127, 131, and 132 by flexible diaphragms 133 and 134 that are carried by the housing means 11 and are separated by a movable spacer 135.

The valve unit 129 has a valve seat 136 for fluidly interconnecting the chamber 132 to a chamber 137 thereof, the valve seat 136 being adapted to be opened and closed by a resilient valve member 138 carried by the flexible diaphragm 134.

The valve unit 129 has a resilient valve seat 139 that is adapted to fluidly interconnect the chamber 137 thereof with another chamber 140, the valve seat 139 being adapted to be opened and closed by a hat-shaped valve member 141 normally urged to an open position by a compressing spring 142 and being controlled by a flexible diaphragm 143 that separates the chamber 140 from another chamber 144 of the valve unit 129.

The chamber 131 of the valve unit 129 is fluidly interconnected by a passage 145 to the port 50 of the selector plate 39.

The chamber 132 of the valve unit 129 is interconnected by a passage 146 to the passage 98, the passage 98 in turn being interconnected to the vent passage 69.

The chamber 137 of the valve unit 129 is interconnected by a passage 147 to a chamber 148 of the valve unit 130.

The chamber 140 of the valve unit 129 is interconnected by a passage 148' to a chamber 149 of the valve unit 130, the chamber 140 of the valve unit 129 also being interconnected by the passage 150 to the port 73 of the selector plate 38.

The chamber 144 of the valve unit 129 is interconnected by a passage 151 to the port 49 of the selector plate 39.

The valve unit 130 has the chamber 128 thereof separated from the chamber 148 thereof by a flexible diaphragm 152 carried by the housing means 11.

The chamber 148 of the valve unit 130 is separated from the chamber 149 thereof by the valve seat 153 adapted to be opened and closed by a valve member 154 normally urged to the closed position thereof by a compression spring 155 whereby the flexible diaphragm 152 can open the valve seat 153 as the same controls the movement of the valve member 154 as will be apparent hereinafter.

Thus, it can be seen that each system 15 is made from the pneumatically operated indicator 23, valve units 86, 87, 101, 129 and 130 and the selector means 16, all of which are packaged in the housing means 11 of the indicator construction 10 of this invention whereby only the selector means 16 need the adjusted to cause the particular system 15 to perform a safety control function for monitoring one of five variables of process machinery, namely a class A variable, a class B variable, a class C variable, an Alarm variable, and a Position variable.

The operation of the system 15 of FIG. 1 as utilized in a main control system will now be described, the parts and details of the main control system not being shown as the same do not form part of this invention and are fully shown and claimed in the aforementioned co-pending patent application.

When the operator desires to start the engine, the operator pushes inwardly on a button of a reset start relay causing it to close so that air from a supply source will immediately flow into the signal passage 79 and also into the control pressure passage 51.

Since the selector means 16 of the system 15 has been set for monitoring a class A variable, the adjustable members 75, 76, 77 and 78 of the selector plates 38 and 39 respectively have been set to interconnect the control port 40 to the port 73, the supply port 45 to the port 74, and the vent port 47 respectively to the ports 49 and 50 as illustrated in FIG. 1.

When supply pressure is applied into the signal passage 79 of system 15 of FIG. 1, it immediately enters through the one-way check valve 81 and branch passages 82 and 83 into the chamber 85 of the valve unit 87 and the chamber 84 of the valve unit 86. The supply pressure in chamber 85 of the valve unit 87 acts on the diaphragm 108 and valve stem 111 to close the valve member 114 against the valve seat 113. The supply pressure in chamber 84 of the valve unit 86 acts on the diaphragm 90 to open the valve seat 93 and with the valve seat 93 open, supply pressure flows into chamber 116 of the valve unit 101 by means of passages 94, 95 and 122, flows into the chamber 33 of the pneumatically operated indicator 23 by means of passages 94, 95 and 122 and flows into chamber 96 of the valve unit 87 by means of passages 94, 95 and 122.

The pressure in chamber 116 of the valve unit 101 acts on the diaphragm 117 to close the valve member 118 against the valve seat 120' and open the valve seat 120 in opposition to the force of the compression spring 119 and, thus, thereby keeping pressure from entering chamber 34 of the pneumatically operated indicator 23 because of the signal pressure 79 being interconnected to the chamber 121 of the valve unit 101 by the passage 124. The closing of the valve seat 120' by the valve member 118 also will prevent pressure from entering the chamber 127 of the valve unit 129 from the signal passage 79 by means of the passage 126 being effectively disconnected from the pressure side of the chamber 121 of the valve unit 101.

Pressure now entering chamber 33 of the pneumatically operated indicator 23 causes the diaphragm 32 to move upwardly in FIG. 1 and raise the stem or plunger 14 so that the spring 30 causes the red portion 27 of the flag means 25 of the rotatable member 12 to be exposed at the window 13 as illustrated in FIG. 4 and temporarily show an unsafe condition of the coolant high temperature for the engine.

However, at the same time supply pressure is also entering line 105 to the sensor 17 of FIG. 1 by means of the signal passage 79 being interconnected by the adjustable member 76 of the selector means 16 to the orifice 106 and, thus, to the sensor passage 105. If the sensor 17 is sensing a safe condition of the engine, pressure will begin to build up in passage 105 and, thus, in chamber 89 of the valve unit 86 by means of passages 103 and 102 interconnecting the sensor passage 105 thereto. Also pressure will build up in chamber 104 of the valve unit 87 by means of the passage 103 interconnecting the chamber 104 to the sensor passage 105.

As pressure builds up in chamber 89 of the valve unit 86, it acts on the diaphragm 91 and movable spacer 92 against the supply pressure acting on the smaller diaphragm 90 in the chamber 84 thereof and closes the diaphragm 90 against the valve seat 93.

As pressure builds up in chamber 104 of the valve unit 87, it acts on diaphragm 110 and movable spacer 112 against the supply pressure acting on the diaphragms 109 and 108 and thereby causes the valve stem 111 to open the valve member 114 away from the valve seat 113 with a snap action and thereby vents the pressure in chamber 116 of the valve unit 101 and chamber 33 of the pneumatically operated indicator 23 because the passage 95 is now interconnected through the opened valve seat 113 of the valve unit 87 to the passage 98 that leads to the vent passage 69.

The venting of the pressure in the chamber 116 of the valve unit 101 allows the spring 119 to open the valve member 118 away from the valve seat 120 and to close against the valve seat 120' whereby pressure from the line 124 now enters the chamber 121 and by means of passage 125 enters the chamber 34 of the pneumatically operated indicator 23 and by means of passage 126 enters the chamber 127 of the valve unit 129.

The pressure now in chamber 34 of the pneumatically operated indicator 23 acts on the diaphragm 32 to push stem 14 downwardly and through its action on the spring 30 rotates the rotatable member 12 to position the green portion 26 of the flag means 25 thereof at the window 13 as illustrated in FIG. 5 to thereby show a safe condition for the variable of the engine that the system 15 is monitoring.

Also, the pressure now existing in chamber 127 of valve unit 129 acts on the diaphragm 133 and through spacer 135 and diaphragm 134 moves and holds the resilient valve member 138 against the valve seat 136. With the valve seat 136 now disconnected from the interconnecting venting passages 146, 98 and 69, pressure can now build up in the control passage 51 because the line 51 will no longer be vented through the valve seat 136 of the valve unit 129 by means of selector member 75, passage 150, chamber 140, open valve seat 139 and chamber 137 of the valve unit 129.

Once pressure has built up in the control passage 51, it acts on a diaphragm of the start relay to hold it in an open position whereby the operator can now release the start button and the start relay will remain in its closed condition of interconnecting the supply pressure to the lines 79 and 51.

This starting action for the engine all takes place in at most a few seconds and the system is now operational and safe as far as the control system 15 is concerned as fuel is adapted to be directed to the engine from the fuel source because the pressure in the control line 51 operates the fuel valve to interconnect the fuel source to the engine. Thus, fuel is continuously supplied to the engine as long as pressure remains in the control line 51.

During the running of the engine, should the monitored variable of the system 15 become unsafe, the sensor 17 will vent pressure in the sensor line 105 and thereby cause venting of the chamber 89 of the valve unit 86 and the chamber 104 of the valve unit 87 by means of interconnecting passages 103 and 102. As pressure drops in the chamber 104 of the valve unit 87, the supply pressure acting on diaphragm 108 will cause the valve member 114 to close the valve seat 113 and the supply pressure acting on diaphragm 90 of the valve unit 86 will cause the valve seat 93 to open with a snap action and thus allow supply pressure from the signal passage 79 to flow from the open valve seat 93 and interconnecting passages 94 and 95 into the chamber 116 of the valve unit 101 and the chamber 33 of the pneumatically operated indicator 23.

With supply pressure now in the chamber 116 of the valve unit 101, the same acts on the diaphragm 117 to cause the valve member 118 to close the valve seat 120' and open the valve seat 120 thereby dumping pressure from the chamber 34 of the pneumatically operated indicator 23 and the pressure in chamber 127 of the valve unit 129 through the open valve seat 120 to the vent line 69 by means of passage 98.

The pressure now in chamber 33 of the pneumatically operated indicator 23 moves the diaphragm 32 upwardly and thereby causes the spring 30 to move the rotatable member 24 to the position illustrated in FIGS. 1 and 4 so that the red portion 27 of the flag means 25 is now present at the window 13 to indicate an unsafe condition.

Also when pressure in the chamber 127 of the valve unit 129 is vented in the above manner, valve member 133 opens under the force of the pressure in the chamber 137 acting against the valve member 138 through the valve seat 136 so that with the valve seat 136 now open, pressure in the control line 51 is vented through selector member 75, passage 150, chambers 140 and 137, open valve seat 136, chamber 132 and passages 146 and 98 to vent passage 69 to thereby cause a shutdown of the engine because the venting of the control line 51 causes the fuel valve to disconnect the fuel source from the engine to complete the shutdown thereof.

The mean effective areas of the valve units 86 and 87 are so calibrated that on falling sensor pressure in the sensor passage 105, the valve seat 113 closes before the valve seat 93 opens and on a rising pressure in the sensor passage 105, the valve seat 93 closes before the valve seat 113 opens.

In this manner, it can be seen that the control system 15 as set in FIG. 1 monitors a class A variable of the process machinery which is normally safe when the process machinery is not running and should the variable become unsafe during the running of the process machinery, the system 15 will indicate an unsafe condition thereby by the pneumatically operated indicator 23 showing a red portion 27 of the flag means 25 at the window 13 as well as open the valve seat 136 to vent the control pressure passage 51 and thereby cause a shutdown of the process machinery. Of course, once the cause of the shutdown has been corrected, the process machinery can be restarted in the manner previously described.

Therefore, it can be seen that in the plurality of systems 15 of this invention for the main control system, each class A variable of the process machinery is monitored in the same way as the class A variable system 15 of FIG. 1 previously described.

Similarly, each class B variable of the engine being monitored by the respective systems 15 operates in the manner now to be described.

The system 15 of FIG. 1 must have the movable selector parts 75 and 76 of the selector means 16 respectively interconnecting the ports 73 and 74 to the control port 40 and to the port 45 in the same manner as in the class A operation. However, the movable parts 77 and 78 for the selector plate 39 are set to respectively interconnect their ports 49 and 50 with the vent port 47 and the class B lockout port 46.

Generally, the system 15 for a class B variable operates in the same manner as the system 15 for a class A variable except that the class B system 15 utilizes the use of the lockout lower portion of the valve unit 129 because class B variables are variables that are normally unsafe when the engine is not running and to start the engine, these variables must be locked out for a predetermined amount of time until the engine is running and they have a chance to become safe, such as the low oil pressure of the engine.

Thus, when attempting a start-up of the main control system, the operator will direct pressure from the pressure source not only to the signal passage 79 and control passage 51 in the manner previously described, but will also direct pressure to pneumatically initiate and activate a class B timer relay so that pressure from the source will be interconnected to the class B lockout passage 65 through the class B timer relay. With pressure in the class B lockout passage 65, the same is directed by the movable part 78 of the selector means 16 through the passage 145 and into chamber 131 of the lower portion of the valve unit 129 to act on the diaphragm 134 to move the same upwardly and close the valve seat 136 with the valve member 138.

With the valve seat 136 of the valve unit 129 now closed, pressure can build up in the control passage 51 because the same is no longer vented through the valve seat 136 as the valve seat 136 is closed from the interconnecting vent passages 146, 98 and 69.

With pressure now built up in the control passage 51, the same causes the fuel control valve to interconnect the fuel source to the engine as previously described in connection with the class A variable operation and thereby cause the engine to begin to run.

Once the engine is started and the class B variable of the low lube pressure has become safe, a chain of events occurs in the system 15 as described in connection with the class A operation to cause chamber 127 of the valve unit 129 to be pressurized.

In particular, when supply pressure is applied to the signal passage 79, it immediately enters the chamber 85 of the valve unit 87 and the chamber 84 of the valve unit 86. The supply pressure in chamber 85 acts on the diaphragm 103 and the valve stem 111 to close the valve seat 113. The supply pressure in the chamber 84 of the valve unit 86 acts on the diaphragm 90 to open the valve seat 93. With the valve seat 93 open, supply pressure flows into the chamber 33 of the indicator 23, the chamber 116 of the valve unit 101 and the chamber 96 of the valve unit 87. The pressure in the chamber 116 of the valve unit 101 acts on the diaphragm 117 to close the valve seat 120 and open the valve seat 120', thus keeping the supply pressure from entering the chamber 34 of the indicator 23 and the chamber 127 of the valve unit 129. Pressure entering chamber 33 of the indicator 23 causes the stem 14 to raise and thereby show a red flag at the window 13.

At the same time, supply pressure is also entering the sensor line 105 to the sensor 17 through the orifice 106. If the sensor 17 subsequently senses a safe condition of the variable being monitored thereby, a pressure will begin to build up in the sensor passageway 105 and in the chamber 89 of the valve unit 86 and the chamber 104 of the valve unit 87. As pressure builds up in the chamber 89 of the valve 86, it acts on the diaphragm 110 and the spacer 112 (against supply pressure acting on the diaphragms 109 and 108) and the stem 111 to open the valve seat 113 with a snap action so as to vent pressure in the chamber 116 of the valve unit 101 and the chamber 33 of the indicator 23. The venting of pressure in the chamber 116 of the valve unit 101 allows the valve seat 120' to open and the valve seat 129 to close which allows pressure to enter the chamber 34 of the indicator 23 and the chamber 127 of the valve unit 129. The pressure in the chamber 34 of the indicator 23 acts on the diaphragm 32 to push the stem 31 downwardly and make a green flag be exposed at the window 13.

At this time, the pressure in the chamber 127 acting on the diaphragm 133 is opposed by the pressure in the chamber 131 so that the diaphragm 133 has not moved upwardly but the valve member 138 is still maintaining the valve seat 136 closed because of the previously described pressure being provided in the chamber 131 of the valve unit 129 by the activated class B timer.

When the predetermined lockout time has expired, the class B timer deactivates to vent the class B lockout passage 65. This vents the pressure from the chamber 131 of the valve unit 129. As chamber 131 of the valve unit 129 depressurizes, the pressure in chamber 127 begins acting on the diaphragm 133 and pushing spacer 135 upwardly agains the diaphragm 134 and the resilient valve member 138 to hold the valve seat 136 closed whereby the class B system 15 is now operational and safe.

Of course, during the predetermined time period of operation of the class B timer, should the sensor 17 never sense a safe condition, pressure will never build up in the sensor passage 105 of the system 15 so that no pressure will be provided in the chamber 127 of the valve unit 129. Thus, when the class B timer vents the class B lockout passage 65, the valve seat 136 will open and thereby cause a shutdown of the engine by venting the control passage 51 through the opened valve seat 136 and cause the indicator 23 to indicate a red condition at the window 13 in the same way as the class A operation previously described as well as in the same way in the operational and safe class B system subsequently becomes safe.

In particular, should the monitored variable being sensed by the sensor 17 become unsafe, the sensor 17 will vent the pressure in the sensor passageway 105 and, thus, vent the chamber 89 of the valve unit 86 and the chamber 104 of the valve unit 87. As pressure drops in the chamber 104 of the valve unit 87, the supply pressure acting on diaphragm 108 will cause the valve seat 113 to close. As the pressure drops in the chamber 89 of the valve unit 87, the supply pressure acting on the diaphragm 90 will cause the valve seat 93 to open with a snap action allowing supply pressure to flow into the chamber 116 of the valve unit 101 and the chamber 33 of hte indicator 23.

Pressure in the chamber 116 of the valve unit 101 causes the valve seat 120' to close and the valve seat 120 to open dumping pressure from the chamber 34 of the indicator 23 and the chamber 127 of the valve unit 129.

Pressure now in the chamber 33 of the indicator 23 causes the rotatable member 12 to show a red flag at the window 13 and when pressure in the chamber 127 of the valve unit 129 is dumped, the valve seat 136 is opened which dumps pressure in the control passageway 51 and thereby causes a shutdown of the engine as previously described.

Thus, it can be seen that in a system 15 of this invention that has been set for monitoring a class B variable, the valve seat 136 of the valve 129 is held closed for a predetermined time from the initial start-up for the class B variable to become safe as the same is normally unsafe at start-up.

The operation of the system 15 of this invention when utilized to monitor a class C variable of process machinery will now be described.

The system 15 must have the movable selector members 75 and 76 set in the same position as for the class A and class B operation previously described while the movable members 77 and 78 respectively interconnect their ports 49 and 50 to ports 48 and 47 of the selector plate 39.

As previously stated, a class C system 15 operates in the same manner as a class A system 15 except that it incorporates the use of a self unlocking lockout portion of the valve unit 129 on start-up as class C variables are those that are normally unsafe when the engine is not running and do not require a certain time period to become safe. Thus, to start the engine, these class C variables must be locked out until the engine is running and are determined safe.

Thus, when the operator attempts a start-up, pressure will be directed into the class C lockout passage 70.

With pressure now entering into the class C lockout passage 70, such pressure will flow into the chamber 144 of the valve unit 129 by means of the selector member 77 and passage 151 and act on diaphragm 143 to press the valve disc 141 against the O-ring valve seat 139 to close the valve seat 139 so that pressure in the control passageway 51 can now build up as the same is no longer vented through the valve seat 139 of the valve unit 129 as the upstream valve seat 139 is now closed.

Thus, with the control passage 51 now being pressurized, the pressure in the control passage 51 causes the class C lockout passage to be connected to vent and, thus, the chamber 144 of the valve unit 129 to vent.

However, when the chamber 144 of the valve unit 129 is vented, the valve seat 136 is open and there is no pressure acting under valve disc 141 so that the pressure in the chamber 140 of the valve unit 129 acting on top of the valve disc 141 holds the disc 141 on the valve seat 139 against the force of the compression spring 142.

Thus, the buildup of pressure in the control passage 51 allows the engine to be started in the manner previously described.

Once the engine is started, and the particular class C variable of the system 15 has become safe, a chain of events occurs in the system 15 as described in connection with the operation of the class A variable to cause the chamber 127 of the valve unit 129 to be pressurized and the chamber 128 of the valve unit 130 to be pressurized.

In particular, when supply pressure is applied to signal passage 79, it immediately enters the chamber 85 of the valve unit 87 and the chamber 84 of the valve unit 86. The supply pressure in the chamber 85 of the valve unit 87 acts on the diaphragm 108 and the valve stem 111 to close the valve seat 113. The supply pressure in the chamber 84 of the valve unit 86 acts on the diaphragm 90 to open the valve seat 93 so that the supply pressure will flow from the open valve seat 93 into the chamber 116 of the valve unit 101, the chamber 33 of the indicator 23 and the chamber 96 of the valve unit 87. The pressure in the chamber 116 of the valve unit 101 acts on the diaphragm 117 to close the valve seat 120' and open the valve seat 120 thus keeping pressure from entering the chamber 34 of the indicator 23 and the chamber 127 of the valve unit 129. Pressure entering the chamber 33 of the indicator 23 causes the rotatable member 12 to show a red flag at window 13. At the same time supply pressure is also entering the sensor passage 105 by the selector member 76 and when the sensor 19 is sensing a safe condition, pressure will begin to build up in the sensor passage 105 and in the chamber 89 of the valve unit 86 and the chamber 104 of the valve unit 87.

As pressure builds up in the chamber 89 of the valve unit 86, it acts on the diaphragm 91 and the spacer 92 (against the supply pressure acting on the diaphragm 90) to close the valve seat 93. As the pressure builds up in the chamber 104 of the valve unit 87, it acts on the diaphragm 110 and the spacer 112 (against the supply pressure acting on the diaphragms 109 and 108) to open the valve seat 113 with a snap action venting the pressure in chamber 116 of the valve unit 101 and the chamber 33 of the indicator 23. The venting of pressure in the chamber 116 of the valve unit 101 allows the valve seat 120' to open and the valve seat 120 to close which allows pressure to enter the chamber 34 of the indicator 23 and the chamber 127 of the valve unit 129. The pressure in the chamber 34 of the indicator 23 acts on the valve stem 14 to cause the movable member 12 to indicate a green flag 26 at the window 13 and the pressure in the chamber 127 of the valve unit 129 acts on the diaphragm 133 to close the valve seat 136 with the valve member 138 as previously described.

With pressure now in the chamber 128 of the valve unit 130, such pressure acts on the diaphragm 152 and moves the same upwardly in opposition to the force of the compression spring 155 to open the valve seat 153.

The opening of the valve seat 153 allows pressure from the chamber 140 of the valve unit 129 to flow through passage 148', the open valve seat 153 of the valve unit 130 and the passage 147 into the chamber 137 of the valve unit 129. When the pressure in the chamber 137 of the valve unit 129 equalizes with the pressure in the chamber 140 thereof, there is no pressure differential acting on the mean effective area of the valve disc 141 to hold it on the O-ring valve seat 139 so that the force of the compression spring 142 acts on the valve disc 141 to push it off of the valve seat 139 thereby allowing a clear flow path between the chambers 140 and 137. At this time the class C system 15 is operational and safe.

Thus, it can be seen that until the sensor 17 for the system 15 senses a safe condition, the indicator 23 will show a red flag at the window 13 and the valve member 141 of the valve unit 129 remains on the valve seat 139 permitting the control passage 51 to maintain its pressure and, thus, maintain the engine in continuous operation.

However, after the system 15 is operational as previously described, should the variable being monitored by the sensor 17 of the system 15 become unsafe, a chain of events occurs in the system 15 as described in connection with class A operation to cause the indicator 23 to give a red flag and the engine to be shut down.

In particular, should the monitored variable of the sensor 17 become unsafe, the sensor 17 will vent the pressure in the sensor line 105 and thus vent the pressure from the chamber 89 of the valve unit 86 and the chamber 104 of the valve unit 87. As the pressure drops in the chamber 104 of the valve unit 87, the supply pressure acting on the diaphragm 108 will cause the valve seat 113 to close. As the pressure drops in the chamber 89 of the valve unit 86, the supply pressure acting on the diaphragm 90 will cause the valve seat 93 to open with a snap action allowing the supply pressure to flow into the chamber 116 of the valve unit 101 and the chamber 33 of the indicator 23. Pressure in the chamber 116 of the valve unit 101 causes the valve seat 120' to close and the valve seat 120 to open dumping pressure from the chamber 34 of the indicator 23 and pressure from the chamber 127 of the valve unit 129. Pressure now in the chamber 33 of the indicator 23 causes the movable member 12 to show the red flag portion 27 of the flag means 25 at the window 13 to indicate an unsafe condition and when pressure in the chamber 127 of the valve unit 129 is dumped, the valve seat 136 is opened which vents the pressure in the control passage 51 and causes a shutdown of the engine as previously described.

Therefore, it can be seen that in the systems 15 that are utilized for monitoring class C variables of the process machinery, each incorporates the use of a self unlocking lockout valve member arrangement 141, 139 of the valve unit 129 on engine start-up so that the particular class C variable that is normally unsafe when the engine is not running and does not require a certain time period to become safe, will be locked out until the engine is running and may become safe so that thereafter should it become unsafe, the system 15 will cause the indicator 23 to indicate a red flag condition and cause an engine shutdown.

When the system 15 is set for an Alarm variable, the system 15 functions in the same manner as when monitoring a class C variable except that the system 15 is used to sound an alarm instead of shutting the engine down because alarm variables are those that can normally be corrected (such as coolant level) without shutting the engine down.

The only difference between a class C setting of the system 15 and an Alarm setting thereof is that the movable selector members 75 and 76 are respectively set to interconnect their ports 73 and 74 respectively to the ports 42 and 43 whereby the chamber 410 of the valve unit 129 is interconnected to the alarm passage 59 by means of the passage 150 and movable member 75 of selector member 16.

Thus, when the operator attempts a start-up, the operator introduces pressure into the control passage 51, signal passage 79 and class C lockout passage 70 in the manner previously described.

Pressure entering into the class C lockout passage 80 will flow into the chamber 144 of the valve unit 129 and act on the diaphragm 143 to press the valve disc 141 closed against the valve seat 139 forming a closed valve seat in advance of the open valve seat 136 so the pressure in the control passage 51 will build up. When the control passage 51 is pressurized, the pressure in control passage 51 acts to remove pressure from the class C lockout passage 70 and interconnect the same to vent whereby the chamber 144 of the valve unit 129 is evacuated. However, since the valve seat 139 of the valve unit 129 is opened at this time and there is no pressure under the disc 141, the pressure in chamber 140 acts on top of the valve disc 141 to hold the same agains the valve seat 139 in opposition to the force of the compressing spring 142 when the pressure in the chamber 144 is dumped. The build up of the pressure in the control passage 51 starts the engine in the manner previously described.

Since the indicator 17 is sensing a safe condition, supply pressure cannot be connected to the alarm horn as long as pressure exists in the alarm passage 59. With pressure in the alarm passage 59, the same acts on top of the valve disc 141 to hold the same against the valve seat 139.

At the same time when supply pressure is applied to the signal passage 79, it immediately enters the chamber 85 of the valve unit 87 and the chamber 84 of the valve unit 86 to subsequently cause the valve seat 120 of the valve unit 101 to open and the valve seat 120' thereof to close so that the indicator 23 will temporarily indicate a red flag condition and the chamber 127 of the valve unit 129 will be prevented from receiving supply pressure as in the class A, class B and class C variable operations previously described.

At the same time, supply pressure is also entering into the sensor passage 105 and if the condition being sensed by the sensor 17 of the system 15 is safe, pressure will begin to build up in passage 105 and thereby cause the valve units 86, 87, and 101 to cause the indicator 23 to show a green flag condition and provide pressure in the chamber 127 of the valve unit 129 to close the valve seat 136 as previously described in connection with the class A, class B, and class C operations.

When the variable being sensed by the sensor 17 of the alarm system 15 is determined unsafe, a chain of events occurs in the circuit 15, as described in connection with the class A operation, to cause the indicator 23 to provide a red flag at the window 13 and the valve seat 136 to open because of the venting of the pressure from the chamber 127 of the valve unit 129.

When the valve seat 136 opens, the pressure in the alarm passage 59 vents through the open valve seat 136 because the valve unit 130 has caused the valve member 141 to be in an open condition from the valve seat 139 as previously described in connection with the class C operation.

In particular, when the valve seat 136 was closed by the pressure in the chamber 127 of the valve unit 129, pressure also existed in the chamber 128 of the valve unit 130 to open the valve seat 153 allowing pressure from the chamber 140 to flow to the chamber 137. Thus, when the pressure is equalized across the valve disc 141, the compression spring 142 opens the valve member 141 away from the valve seat 139 but the alarm passage 59 is prevented from being interconnected to the vent by the closed valve seat 136.

However, now that an unsafe condition has caused the valve seat 136 to open, the pressure in the alarm passage 59 is vented which causes the alarm horn to provide a continuous warning sound of the unsafe condition being sensed by the sensor 17 of the system 15.

An operator who hears the alarm horn can push an alarm silencing button that introduces pressure into the class C lockout pasage 70 and chamber 144 of the valve unit 129 because of the selector member 77 of the selector means 16 being connected to the class C lockout port 48.

The pressure now in the chamber 144 of the valve unit 129 acts on the diaphragm 143 to press the valve disc 141 against the valve seat 139 which causes pressure to build up again in the alarm passage 59 which silences the alarm horn. The operator can now correct the unsafe variable and once the unsafe variable is made safe a chain of events occurs in the system 15 as described in connection with the class C operation of the system 15 to cause the indicator 23 to show a green flag 26 at the window 13 and the valve member 141 of the valve unit 129 to unseat and connect the chambers 140 and 137 of the valve unit 129 again whereby the variable being sensed by the sensor 17 of the system 15 is now operational and safe again.

In particular, with the sensor 17 now sensing a safe condition, pressure again builds up in the sensor passage 105 to cause the valve units 86, 87 and 101 to cause the indicator 23 to show a green flag 26 at window 13 and to have the chamber 127 of the valve unit 129 and the chamber 128 of the valve unit 130 pressurized so that the valve seat 136 is closed and the valve member 141 will open the valve seat 139 because of the opened valve seat 153 of the valve unit 130 in the manner previously described.

Therefore, it can be seen that the systems 15 can be respectively set to monitor alarm variables for the process machinery and each such alarm set system 15 will operate in the manner previously described.

The systems 15 also can be set for monitoring Position variables of the process machinery.

In particular, the movable members 75 and 76 of the selector means 16 are set so that the same respectively interconnect their ports 73 and 74 to plugged ports 41 and 44 whereby the members 75 and 76 do not interconnect any pressure to their ports 73 and 74 and are now dead ended.

The movable members 77 and 78 of the selector plate 39 are respectively disposed to interconnect their ports 49 and 50 with the port 47 as illustrated.

Since position indicators perform no other function than giving a flag indication of a variable such as a valve position opened or closed, it does not initiate a shut-down or sound an alarm. Thus, the selector means 16 is adjusted in the manner previously described so that the pressure from the control passage 51, the alarm passage 59, the class B lockout passage 65, and the class C lockout passage 70 cannot enter the indicator logic for operating the indicator 23 as previously described.

Also, pressure from the supply signal passage 79 cannot be directed to the sensor passage 105 through the orifice 106 and, thus, be directed to the chambers 104 and 89 of the valve units 87 and 86.

However, a pressure source that operates the variable to be monitored by the sensor 17 is connected to the passage 105.

Supply pressure from the signal passage 79 is adapted to enter the chambers 84 and 85 of the valve units 86 and 87 whereby the valve units 86, 87, and 101 cause the indicator 23 to show a red flag condition at the window 13 thereby showing that the condition being monitored is in one position thereof, which in this example is a pneumatically operated valve 17.

When the supply pressure to the variable 17 is interconnected thereto to cause the same to move to another position thereof, such pressure now being directed into the sensor passage 105 builds up in chambers 89 and 104 of the valve units 86 and 87 to cause the valve unit 101 to interconnect the supply pressure to the chamber 34 of the indicator 23 and move the movable member 12 to position the green portion 26 of the flag means 25 at the window 13 to thereby show the device being monitored by the system 15 is in another position thereof.

When the pressure is removed from the valve 17 to cause the device 17 to move back to the other condition thereof, the sensor passage 105 is vented and thereby causes the valve units 86, 87 and 101 to operate the indicator 23 in the manner previously described to show the red portion 27 of the flag means 25 at the window 13.

Therefore, it can be seen that when a system 15 is set for monitoring a Position variable thereof, the system 15 through the flag means 25 indicates two different conditions without causing an alarm or shutdown of the process machinery.

From the above, it can be seen that each system 15 is identical to the other systems 15 and only the selector means 16 thereof is adjusted to cause that particular system to monitor one of the five conditions previously described, namely a class A variable, a class B variable, a class C variable, an Alarm variable, or a Position variable.

As previously stated, one of the features of this invention is to provide a self-contained indicator construction 10 that incorporates therein the selectively changeable safety control system 15 previously described.

Accordingly, the housing means 11 of the indicator construction 10 of this invention is formed of three sections that are generally indicated by the reference numerals 160, 161, and 162 in FIG. 4 with the housing section 160 comprising a plurality of plates 163, 164, 165, 166 and 167 stacked and secured together while containing the one-way check valve means 81 and valve unit 87 (FIG. 4), valve unit 86 and valve unit 101 (FIG. 6) and valve unit 129 and valve unit 130 (FIG. 7) all of which are respectively fluidly interconnected together by appropriate channels and openings formed in the plates 163-167 in a manner well known in the art.

In addition, the housing section 160 has flexible diaphragms 168, 169, 170 and 171 disposed between the plates 163-167 not only to seal the channels thereof, but also to provide the various operating diaphragms for the valve units 87, 87, 101, 120 and 130 thereof. Thus, the diaphragm 170 of the housing section 160 provides the diaphragm portion 32 that is interconnected to the upper end 172 of the plunger 14 that extends out of an opening 173 in the lower plate 167 and is sealed thereto by a suitable resilient O-ring 174 which permits axial movement of the plunger 14 relative to the housing means 11 to operate the rotatable member 12 for the purpose previously set forth.

Figure 6:
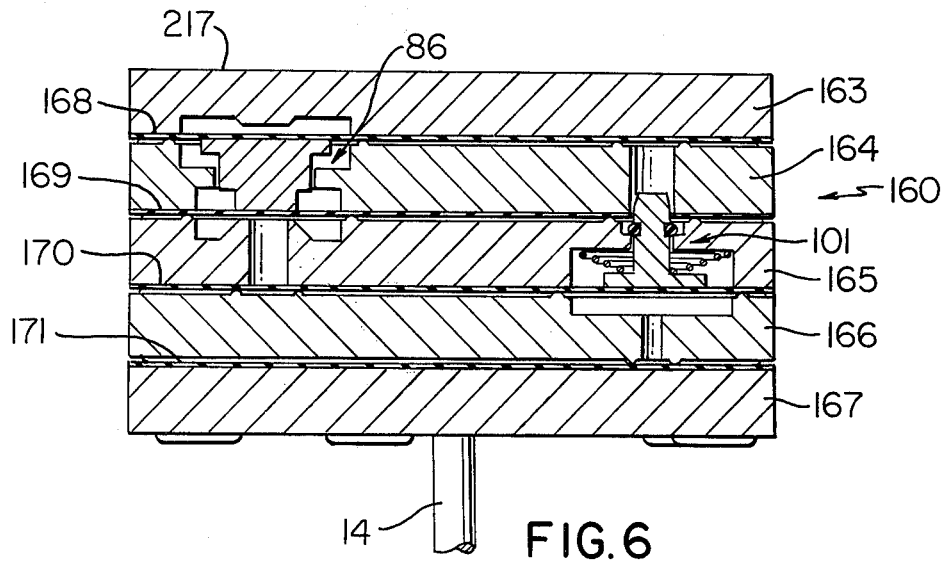
FIG. 6 is an enlarged cross-sectional view taken on line 6—6 of FIG. 2 and illustrates only the logic section of the indicator construction of FIG. 2.

Thus, the housing section 160 containing the pneumatic control means for the plunger 14 can be readily removed from the housing section 161 as illustrated in FIGS. 6 and 7 and carry the plunger 14 therewith so that should a malfunction occur in the particular part of the system 15 that is contained in the housing section 160 of a particular indicator unit 10, the malfunctioning housing section 160 can be readily removed therefrom and a new housing section 160 replaced therefor in a simple and effective manner as will be apparent hereinafter.

The intermediate housing section 161 of the indicator construction 10 is a manifold section which has a plurality of passages 175, 176, 177, 178, 179 and 180 passing completely therethrough from one opposed side 181 thereof as illustrated in FIG. 12 to the other opposed side 182 thereof as illustrated in FIG. 13, the manifold passages 175-180 also interconnecting with the housing section 160 by means of branch passages that interconnect with the top surface 183 of the housing section 161 as illustrated in FIG. 10, such branch passages being indicated by the reference numeral 184 in FIG. 10.

In this manner, the manifold section 161 of a particular indicator construction 10 of this invention can be fluidly coupled to another indicator construction 10 either by conduit means extruding between like passages 175-180 of the adjacent manifold sections 161 or by having the two manifold sections 161 plugged together in the manner illustrated in FIGS. 14 and 16. In particular, the passages 175-180 at the side 182 of each manifold section 161 is provided with outwardly directed integral nipple means 185 that can be received in nipple receiving recesses 186 formed in the side 181 of the adjacent manifold section 161. Of course, suitable resilient O-rings 187, FIGS. 14 and 16, can be disposed on the nipple means 185 to seal the same in the cooperating recess means 186 of the adjacent manifold section 161.

The bottom surface 188 of the manifold section 161 is provided with a recess 189 therein that cooperates with a recess 190 in the side 191 of the housing section 162 when the same are suitable fastened together as illustrated in FIG. 4 to define a chamber 192 in the housing means 11 that receives the rotatable flag member 12 of the indicator 23 in a manner hereinafter described.

An opening 193 passes completely through the opposed sides 183 and 188 of the housing section 161 and through which the axially movable plunger 14 extends when the housing sections 160 and 161 are suitably fastened to each other as illustrated in FIG. 4. The side 188 of the housing section 161 is provided with four pivot recesses 194 each disposed 90° apart from adjacent recesses 194 and being adapted to be closed by the cooperating surface 191 of the housing section 162 in the manner illustrated in FIG. 8 so as to pivotally mount the rotatable flag member 12 in the chamber 192 of the housing means 11 when the housing sections 161 and 162 are secured together.

In particular, it can readily be seen in FIGS. 8 and 9 that the rotatable flag member 12 has a pair of spaced-apart outwardly directed pivot pins 195 which are adapted to be respectively disposed in any two of the pivot means 194 that are disposed 180° apart and thereby be rotatably mounted to the housing means 11.

The unique spring means 30 of this invention that operatively interconnects the movable plunger 14 to the rotatable flag member 12 is best illustrated in FIG. 9 and comprises a body portion 196 carrying a pair of outwardly extending ears 197 respectively having openings 198 passing therethrough and being adapted to receive inwardly directed spaced-apart pins 199 of the rotatable member 12 which are disposed in aligned relation with the outwardly directed pivot pins 195 thereof as illustrated in FIG. 8. In this manner, the spring member 30 is carried by the rotatable flag member 12 when assembled thereto.

The spring member 30 has a leaf part 200 integrally interconnected to the body portion 196 thereof and looped 180° from the body part 196 to extend downwardly between the opposed ears 197 thereof and be provided with a free end 201 which is stepped toward the body portion 196 by an intermediate stepped portion 202 of the leaf portion 200 as illustrated in FIGS. 4 and 9, the resulting looped portion 203 of the leaf portion 200 having an opening 204 passing therethrough which is adapted to telescopically receive the free end 205 of the plunger 14 as illustrated in FIG. 4 whereby the plunger 14 is operatively interconnected to the spring member 30.

The free end 201 of the leaf portion 200 of the spring member 30 has a pair of ears 205' which cooperate with the free end 201 to define a notch 206 which is adapted to receive a pin 207 of the rotatable member 12 whereby the free end 201 of the leaf portion 200 of the spring member 30 is operatively interconnected to the rotatable member 12, the pin 207 being disposed parallel to the pivot pins 195 but being in offset relation thereto as illustrated in FIG. 4 so as to permit the free end 201 of the spring member 30 to pivot or rotate the flag member 12 relative to the housing means 11 on its pivot pins 195 in a manner now to be described.

During the operation of the indicator construction 10 of this invention under the control of the system 15 previously described, every time fluid pressure is directed to the chamber 33 to act on the diaphragm portion 32 to move and hold the diaphragm portion 32 upwardly as illustrated in FIG. 4 whereby the plunger 14 is moved and held upwardly, it can be seen that the free end 205 of the plunger 14 is spaced above the stepped portion 202 of the leaf portion 200 of the spring member 30 so that the natural resiliency of the leaf member 200 causes the free end 201 thereof to be disposed in the position illustrated in FIG. 4 and through its interconnection with the pin 207 of the flag member 12, the same holds the flag member 12 in the rotatable or pivoted position illustrated in FIG. 4 whereby the red portion 27 of the flag means 25 of the rotatable member 12 is positioned at the opening 13 in the housing section 162 to thereby indicate an unsafe condition at the window means 13 of the indicator construction 10 for the reasons previously set forth.

However, anytime the chamber 33 of the indicator construction 10 is vented and fluid pressure is directed to the chamber 34 thereof to act on the diaphragm 32 to move the diaphragm 32 downwardly as illustrated in FIG. 5, the free end 205 of the thus downwardly moving plunger 14 cams against the stepped portion 202 of the leaf portion 200 and forces the leaf portion 200 to the right in FIG. 5 relative to the main body portion 196 of the spring member 30 which is confined from following the rightward movement by the plunger 14. Thus, the movement of the free end 201 of the leaf portion 200 of the spring member 30 to the right to the position illustrated in FIG. 5 causes the rotatable member 12 to rotate counterclockwise or pivot to the position illustrated in FIG. 5 whereby the green portion 26 of the flag means 25 thereof is now held in a pivoted position to be viewable through the window means 13 of the housing section 162 for the reasons previously set forth.

Upon the returning upward movement of the plunger 14 by the system 15 causing the chamber 33 to be pressurized and the chamber 34 to be vented, the free end 205 of the plunger 14 cams upwardly beyond the stepped portion 202 of the leaf portion 200 whereby the natural resiliency of the leaf portion 200 causes the free end 201 thereof to return from the position illustrated in FIG. 5 to the position illustrated in FIG. 4 and thereby rotate the rotatable member 12 clockwise back to the position of FIG. 4 where the red portion 27 of the flag means 25 is now positioned at the window means 13 of the housing means 162.

Therefore, it can be seen that the unique spring member 30 of this invention is operatively interconnected to the plunger 14 and is operatively interconnected to the rotatable flag member 12 to transmit motion of the movable plunger 12 to the flag member 12 while still permitting the housing section 160 to be readily removed from the housing section 161 when desired.

In order to hold the spring member 30 in an aligned position so as to receive a plunger 14 of a new housing section 160 being assembled to the interconnected housing sections 161 and 162, the housing section 161 is provided with four pin-like abuttments 208 which are adapted to receive and engage against the looped portion 203 of the spring member 30 as illustrated in FIGS. 4 and 5. Thus, should the plunger 14 be removed from the opening 204 of the spring member 30, the opening 204 of the spring member 30 will be properly positioned relative to the opening 193 of the housing section 161 in order to properly receive a new plunger 14 when the new housing section 160 is attached thereto for the reasons previously set forth.

Should it be desired to have the flag member 12 rotate about an axis 90° different than the axis of rotation illustrated in FIGS. 4 and 5, the housing section 162, flag member 12 and its interconnected spring member 30 can be removed from the housing section 161 and be rotated as a unit 90° from its previous position whereby the pivot pins 195 of the flag member 12 will now be received in the other pair of pivot recesses 194 of the housing section 161 and the looped portion 203 of the spring member 30 will be disposed between the aligning abuttments 208 in a direction 90° different than before whereby the flag means 12 and window means 13 will be oriented in a position 90° different than before with the operation of the rotatable member 12 being identical to the previously described operation thereof.

This permits the indicator constructions 10 of this invention to be stacked together in either a horizontal manner as illustrated in FIG. 14 which the long portion of the window 13 being horizontal therewith or permit the indicator constructions 10 to be stacked vertically as illustrated in FIG. 16 if the structure illustrated in FIG. 16 is rotated 90° so that the long portions of the windows 13 thereof would still be disposed horizontal for best viewing thereof.

When the indicator constructions 10 of this invention are stacked together as illustrated either in FIGS. 14 or 16, a main manifold member 210 can be provided for interconnecting external lines to the passages 175-180 of the interconnected indicator constructions 10.

For example, such manifold section 210 is best illustrated in FIGS. 14 and 15 and comprises a body part 211 having a nipple receiving openings 212 at one side 213 thereof to receive the outwardly directed nipples 185 of the end indicating unit 10 to have the internal passages 214 of the manifold member 210 fluidly interconnected with the passages 175-180 of the end unit 10. Of course, suitable resilient O-ring sealing means 215 can be utilized to seal the nipple means 185 in the recesses 212 of the manifold member 210.

The manifold member 210 has the passages 214 thereof interrupting the top surface 216 thereof for interconnecting to external lines in a manner well known in the art.

Thus, it can be seen that the manifold member 210 can be utilized for interconnecting external lines to the stack of indicator constructions 10 of this invention whereby all of the fluid passages 175-180 of the indicator constructions 10 can be fluidly interconnected to the external lines through the end manifold member 210 and the adjacent indicator constructions 10 as the case may be, the last indicator constructions 10 in the stack thereof having the passages 175-180 at the side 181 thereof suitably plugged.

Of course, the manifold section 210 could be utilized with only one indicator construction 10 if desired.

The selector means 16 for each indicator construction 10 of this invention is formed by having the selector plate means 38 and 39 provided on the outer surface 217 of the end plate 163 of the housing section 160 and being covered by rotatable selector members 218 each of which has its under surface provided with suitable grooves 219 which are utilized to fluidly interconnect together certain ports of the plate means 38 and 39 depending upon the rotational position of the selector member 218 in a manner well known in the fluid switching art. Thus, the fluid transmitting grooves 219 in the selector members 218 provide the function of the members 75-78 of FIG. 1 previously described.

The end plate 163 of the housing section 160 that carries the selector members 218 also contains an output connector 220 which interconnects with the sensor passage 105 to permit the passage 105 to be interconnected to the desired sensor or item that is to have the position thereof indicated, as desired.

Therefore, it can be seen that each indicator construction 10 of this invention contains the indicator 23 and valve units 86, 87, 101, 129 and 130 of the system 15 previously described with the housing means 11 of the indicator construction 10 being uniquely formed to readily permit the logic section 160 of the indicator construction 10 to be readily removed therefrom and be replaced as well as permit the rotatable flag member 12 to be disposed in any desired 90° position thereof all because of the unique spring means 30 of this invention.

However, as previously stated, this invention is not to be limited to the housing section 160 containing the particular control system 15 previously described as the section 160 can contain other control systems or not contain any control system as desired.

Therefore, it can be seen that this invention provides an improved indicator construction.

While the form of the invention now preferred has been illustrated and described as required by the Patent Statute, it is to be understood that other forms can be utilized and still fall within the scope of the appended claims.

What is claimed is:

1. In an indicator construction having a housing means carrying a movable flag means and a movable plunger operatively associated with said flag means to cause movement thereof upon movement of said plunger by control means carried by said housing means and being operatively interconnected to said plunger, the improvement comprising a spring member having means operatively interconnected to said plunger and having means operatively interconnected to said movable flag means to cause movement thereof upon movement of said plunger, said flag means being pivotally carried by said housing means, said spring member holding said flag means in one pivoted position thereof by the normal bias of said spring member when said plunger is in one position relative to said housing means, said plunger forcing said spring member out of its normal bias position to another position thereof to hold said flag means in another pivoted position thereof when said plunger is in another position relative to said housing means, said spring member having a leaf portion, said plunger camming against said leaf portion to force said leaf portion to said another position of said spring member and thereby move said flag means to said another position thereof when said plunger is moved to said another position thereof, said leaf portion of said spring member having a step therein, said plunger camming against said step to force said leaf portion to said another position and thereby move said flag means to said another position thereof.

2. An indicator construction as set forth in claim 1 wherein said plunger has a free end, said free end of said plunger being spaced from said step of said leaf portion when said plunger is in said one position thereof and camming against and beyond said step when said plunger is in said another position thereof.

3. An indicator construction as set forth in claim 1 wherein said spring member has a body portion interconnected to said leaf portion, said body portion having an opening therethrough that telescopically receives said plunger therein to provide said means that operatively interconnects said plunger to said spring member.

4. An indicator construction as set forth in claim 3 wherein said body portion is pivotally carried by said flag means.

5. An indicator construction as set forth in claim 1 wherein said flag means has a pin portion disposed parallel to the pivot axis thereof but offset relative thereto, said leaf portion having a free end interconnected to said pin.

6. An indicator construction as set forth in claim 5 wherein said flag means has a pair of spaced aligned pivot pins that pivotally mount said flag means to said housing means.

7. An indicator construction as set forth in claim 1 and wherein said control means includes pneumatic control means carried by said housing means for controlling movement of said plunger relative to said housing means.

8. An indicator construction as set forth in claim 7 wherein said housing means comprises a plurality of detachable sections, one of said sections containing all of said pneumatic control means.

9. An indicator construction as set forth in claim 8 wherein said plunger is secured to said one section to be carried thereby when said one section is detached from said housing means.

10. An indicator construction as set forth in claim 8 wherein said pneumatic means comprises means for monitoring a variable of process machinery.

11. An indicator construction as set forth in claim 8 wherein another section of said housing means comprises a manifold for interconnecting external pneumatic lines to said pneumatic means of said one section.

12. An indicator construction as set forth in claim 11 wherein said manifold is adapted to plug into another manifold of a like indicator construction to fluidly interconnect the same together.

13. An indicator construction as set forth in claim 8 wherein another section of said housing means contains a window for exposing said flag means.

14. An indicator construction as set forth in claim 13 wherein said another section is adapted to be interconnected to the remainder of said housing means in different rotational positions to position said window in different positions.

* * * * *